United States Patent
Bourne et al.

(10) Patent No.: US 6,773,649 B2
(45) Date of Patent: Aug. 10, 2004

(54) FILM EXTRUSION PROCESS FOR PRODUCING THERMOPLASTIC FILM

(75) Inventors: Robert Allan Bourne, Mt. Vernon, IN (US); Dennis Joseph Coyle, Clifton Park, NY (US); Kenneth L. Lilly, West Chester, OH (US); Robert Morrow, Mt. Vernon, IN (US); Brian Scott Schenk, Evansville, IN (US); Russell Wayne Wildeman, Mt. Vernon, IN (US)

(73) Assignee: General Electric Company, Pittsfield, MA (US)

(*) Notice: Subject to any disclaimer, the term of this patent is extended or adjusted under 35 U.S.C. 154(b) by 345 days.

(21) Appl. No.: 09/785,390

(22) Filed: Feb. 16, 2001

(65) Prior Publication Data

US 2002/0114922 A1 Aug. 22, 2002

(51) Int. Cl.[7] .............................................. B29C 47/00
(52) U.S. Cl. .............................. 264/210.2; 264/211.12; 264/284; 425/363
(58) Field of Search ............................. 264/210.2, 175, 264/176.1, 211.12, 284; 425/363, 194, 327, 366, 367, 362; 428/409

(56) References Cited

U.S. PATENT DOCUMENTS

| | | | |
|---|---|---|---|
| 2,291,005 A | * 7/1942 | Strang | 19/258 |
| 3,387,348 A | * 6/1968 | Kilgallon | 425/110 |
| 3,449,548 A | * 6/1969 | Adamek | 219/216 |
| 3,756,760 A | 9/1973 | McBride | |
| 4,351,920 A | 9/1982 | Ariga et al. | 525/67 |
| 4,791,275 A | * 12/1988 | Lee et al. | 219/469 |
| 4,925,379 A | 5/1990 | Bourelier | |
| 5,076,987 A | 12/1991 | Wank et al. | |
| 5,149,481 A | 9/1992 | Gross et al. | |
| 5,240,666 A | * 8/1993 | Schnyder et al. | 425/363 |
| 5,242,742 A | 9/1993 | Funk et al. | |
| 5,286,436 A | 2/1994 | Funk et al. | |
| 5,952,017 A | * 9/1999 | Nishida et al. | 425/363 |

* cited by examiner

Primary Examiner—Mark Eashoo

(57) ABSTRACT

An apparatus for producing a thermoplastic film having low-birefringent, low stress and at least one polished surface for optical media applications as well as low stress film for non-optical applications using a continuous extrusion process. The apparatus consists of a novel calendering roll in a calendering roll stack wherein, at least one roll consists of an inner steel shell, a resilient covering over the inner steel roll and a multi-layer metal sleeve outer covering of at least two layers. The metal sleeve preferably consists of three layers. The inner layer of the multi-layer outer sleeve is preferably nickel, the intermediate layer is preferably copper and the outer layer is preferably chrome with a highly polished surface. The film produced by the process has a retardation value (birefringence times thickness) of less than about 100 nanometers and a surface roughness of less than about 4 microinches. The process is a continuous extrusion process for producing such film or sheet and does not require any further finishing operations.

12 Claims, 3 Drawing Sheets

SECTION B-B'

FILM EXTRUSION PROCESS FOR PRODUCING THERMOPLASTIC FILM

BACKGROUND OF THE INVENTION

The invention relates to an apparatus for producing low-birefringent and/or low stress plastic film or sheet having a high surface-polish and is suitable for optical media applications as well as low stress film for non optical applications either one using a continuous extrusion process. Optical media applications include such items as compact discs (CD), digital video discs (DVD), liquid crystal displays (LCD) or any other optical media applications which require a transparent substrate with low birefringence low stress and a high surface-polish. Non optical applications using low stress film or sheet for use in such applications as automobile dash board overlays or other uses for opaque film or sheet which require tight graphics registration. Birefringence is not measurable in opaque film or sheet.

More particularly, this invention relates to a particular calendering or process finishing roll stack wherein the structure of at least one of the finishing rolls is comprised of an inner steel shell, a resilient covering thereover and a multi layer metal sleeve outer covering. Film or sheet produced using the roll structure of this invention has low-birefringence, low stress and is highly polished on at least one surface i.e. a surface having a low roughness of 4 microinches or less which film or sheet is suitable for optical media applications or opaque film or sheet for such other non optical applications. Such film or sheet is produced in a one step continuous extrusion process.

Currently, polycarbonate is used as the polymeric material for optical media applications such as CD's and are made by injecting molding. The process is relatively slow and expensive. In addition, it is difficult to produce CD's of very low-birefringence which will be required to reach higher data densities in the future. CD's currently produced today have a retardation value of 25–30 nm. (nanometers), which is birefringence times thickness. Stress and birefringence are inherent in injection molding CD's because the melt starts to solidify on the inside mold wall as the mold is filling, and then additional melt is forced into the mold cavity to compensate for shrinkage of the disc as it solidifies. In opaque film or sheet, birefringence is not measurable but low stress is wanted for applications in vehicles, computer housings, etc. that require tight (0.4 mm/MAX) graphics registration.

Birefringence is defined as the difference between the refractive indices along two perpendicular directions as measured with polarized light along these directions. It results from molecular orientation, and the measurement of birefringence is the most common method of characterising polymer orientation. It is determined by measurement of the retardation distance by either a compensation or a transmission method. Positive birefringence results when the principal optic axis lies along the chain; negative birefringence when transverse to the chain. In Cartesian coordinates there are three birefringences, two being independent. Thus $\Delta xy = n_x - n_y$, the differences in refractive indices along the x and y axes. Uniaxial orientation only requires one of these to describe the orientation. Therefore, in order to obtain a uniform homogeneous polycarbonate, the lower the birefringence (the differences between the refractive indices) the more homogeneous the polymer composition of the product and thus the more uniform properties of the product. This is critical, particular on CD's, DVD's or LCD wherein the Laser read out must have minimal or zero distortion. The lower birefringence, the less is the variation in polymer homogeninity and Laser distortion.

Another parameter for optical materials is Cg which is the stress-optical coefficient of material in the glassy state. It can be measured with a molded part such as a small bar or disc. Birefringence can be measured by the method described above. When a stress is applied to the bar, the birefringence will change by an amount B. The stress-optical coefficient, which has units of Brewsters, is given by:

$$B = Cg\ \delta$$

The stress-optical coefficient (Cg) should be less than or equal to about 70 Brewsters.

Improvements in optical data storage media, including increased data storage density, are highly desirable, and achievement of such improvements is expected to improve well established and new computer technology such as read only (ROM), write once, rewritable, digital versatile and magneto-optical (MO) disks.

In the case of CD ROM technology, the information to be read is imprinted directly into a moldable, transparent plastic material, such as bisphenol A (BPA) polycarbonate. The information is stored in the form of shallow pits embossed in a polymer surface. The surface is coated with a reflective metallic film, and the digital information, represented by the position and length of the pits, is read optically with a focused low power (5 mW) laser beam. The user can only extract information (digital data) from the disk without changing or adding any data. Thus, it is possible to "read" but not to "write" or "erase" information.

The operating principle is a write once read many (WORM) drive is to use a focused laser beam (20–40 mW) to make a permanent mark on a thin film on a disk. The information is then read out as a change in the optical properties of the disk, e.g., reflectivity or absorbance. These changes can take various forms: "hole burning" is the removal of material, typically a thin film of tellurium, by evaporation, melting or spalling (sometimes referred to as laser ablation); bubble or pit formation involves deformation of the surface, usually of a polymer overcoat of a metal reflector.

Although the CD-ROM and WORM formats have been successfully developed and are well suited for particular applications, the computer industry is focusing on erasable media for optical storage (EODs). There are two types of EODs: phase change (PC) and magneto-optic (MO).

Generally, amorphous materials are used for MO storage and have a distinct advantage in MO storage as they do not suffer from "grain noise", spurious variations in the plane of polarization of reflected light caused by randomness in the orientation of grains in a polycrystalline film. Bits are written by heating above the Curie point, $T_C$, and cooling in the presence of a magnetic field, a process known as thermomagnetic writing. In the phase-change material, information is stored in regions that are different phases, typically amorphous and crystalline. The film is initially crystallized by heating it above the crystallization temperature. In most of these materials, the crystallization temperature is close to the glass transition temperature. When the film is heated with a short, high power focused laser pulse, the film can be melted and quenched to the amorphous state. The amorphized spot can represent a digital "1" or a bit of information. The information is read by scanning it with the same laser, set at a lower power, and monitoring the reflectivity.

In the case of WORM and EOD technology, the recording layer is separated from the environment by a transparent, non-interfering shielding layer. Materials selected for such "read through" optical data storage applications must have outstanding physical properties, such as moldability, ductility, a level of robustness compatible with particular use, resistance to deformation when exposed to high heat or high humidity, either alone or in combination. The materials should also interfere minimally with the passage of laser light through the medium when information is being retrieved from or added to the storage device.

As data storage densities are increased in optical data storage media to accommodate newer technologies, such as DVD and higher density data disks for short or long term data archives, the design requirements for the transparent plastic component of the optical data storage devices have become increasingly stringent. Materials displaying lower birefringence at current, and in the future progressively shorter "reading and writing" wavelengths have been the object of intense efforts in the field of optical data storage devices.

Birefringence in an article molded from polymeric material is related to orientation and deformation of its constituent polymer chains. Birefringence has several sources, including the structure and physical properties of the polymer material, the degree of molecular orientation in the polymer material and thermal stresses in the processed polymer material. For example, the birefringence of a molded optical article is determined, in part, by the molecular structure of its constituent polymer and the processing conditions, such as the forces applied during mold filling and cooling, used in its fabrication which can create thermal stresses and orientation of the polymer chains.

The observed birefringence of a disk is therefore determined by the molecular structure, which determines the intrinsic birefringence, and the processing conditions, which can create thermal stresses and orientation of the polymer chains. Specifically, the observed birefringence is typically a function of the intrinsic birefringence and the birefringence introduced upon molding articles, such as optical disks. The observed birefringence of an optical disk is typically quantified using a measurement termed "in-plane birefringence" or IBR, which is described more fully below.

For a molded optical disk, the IBR is defined as:

$$IBR=(n_r-n_\theta)d=\Delta n_{r\theta}d \qquad (3)$$

where $n_r$ and $n_\theta$ are the refractive indices along the r and θ cylindrical axes of the disk; $n_r$ is the index of refraction seen by a light beam polarized along the radial direction, and $n_\theta$ is the index of refraction for light polarized azimuthally to the plane of the disk. The thickness of the disk is given by d. The IBR governs the defocusing margin, and reduction of IBR will lead to the alleviation of problems which are not correctable mechanically. IBR is a property of the finished optical disk. It is formally called a "retardation" and has units of nanometers.

In applications requiring higher storage density, such as DVD recordable and rewritable material, the properties of low birefringence and low water absorption in the polymer material from which the optical article is fabricated become even more critical. In order to achieve higher data storage density, low birefringence is necessary so as to minimally interfere with the laser beam as it passes through the optical article, for example a compact disk.

Materials for DVD recordable and rewritable material require low in-plane birefringence, in particular preferably less than about +/−40 nm single pass; excellent replication of the grooved structure, in particular greater than about 90% of stamper; and reduced water uptake as compared to BPA polycarbonate.

Another critical property needed for high data storage density applications, in particular DVD recordable and rewritable material, is disk flatness. The disk flatness is dependent upon the flatness of the polycarbonate substrate immediately after the injection molding process as well as the dimensional stability of the substrate upon exposure to high humidity environments. It is known that excessive moisture absorption results in disk skewing which in turn leads to reduced reliability. Since the bulk of the disk is comprised of the polymer material, the flatness of the disk depends on the low water solubility and low rate of water diffusion into the polymeric material. In addition, the polymer should be easily processed in order to product high quality disks through injection molding.

There is a distinct economic advantage of producing said film and sheet for discs for optical media applications via a continuous film extrusion process, whereby a continuous plastic web of 4–8 feet wide could be produced at speeds of 10–60 feet/minute from which discs could be cut out. Extrusion casting, where a melt is extruded through a slot die and deposited on a polished metal roller to solidify, can produce low-birefringence films but the top surface of the film is not smooth enough. Extrusion calendering, on the other hand, whereby a second polished metal roll is added to form a nip between the two rolls to squeeze the plastic on both sides as is solidifies, is widely used to produce very uniform and smooth-surface films. However, the flow in the nip between rigid rolls induces very high stresses and such films have retardation values of hundreds to thousands of nanometers. A resilient elastomeric cover has been put on one of the rolls to produce textured films that have lower stress, but the texture is unacceptable for optical media applications.

U.S. Pat. No. 3,756,760 teaches the use of a single metal outer sleeve of nickel over a rubber-covered roller to accommodate and smooth the non-uniformity of the extrudate from an extrusion die upon delivering melt to the calendering nip. It does not disclose how to use this to control stress in the film and birefringence. In addition, such a sleeve is too fragile to be of practical use.

U.S. Pat. No. 5,076,987 discloses producing optical quality extrusion film by calendering the film between a ground elastic roller and a high gloss steel roller to produce a film having a high gloss surface and a matte surface, or producing a film having a high gloss on both surfaces, by coating the matte surface.

U.S. Pat. No. 5,149,481 discloses extruding a sheet or film into the roll gap of a smoothed upper roll and a lower roll wherein the temperature of the upper roll is below the glass transition temperature of the plastic and the lower roll is maintained at a temperature in the plastic state domain of the plastic sheet or film.

U.S. Pat. No. 5,242,742 is similar to U.S. Pat. No. 5,149,481 except that it discloses a sheet or film having a birefringence of less than 50 nm and preferably less than 20 nm.

U.S. Pat. No. 4,925,379 discloses a process for producing a plastic sheet, wherein at least one layer is a polyurethane layer, by extrusion and pressing at a temperature higher than the softening point of the polyurethane.

U.S. Pat. No. 5,286,436 is a division of U.S. Pat. No. 5,242,742 and claims a sheet or film having a birefringence equal to or less than 50 nm, a low surface roughness and low variation in thickness.

All of the above references do not disclose or teach the particular finishing roll of the instant invention or a low birefringence, low stress highly polished film or sheet by a continuous extrusion process.

Accordingly, it is an object of this invention to produce a low birefringence, low stress, highly surface polished thermoplastic film or sheet on at least one surface thereof.

Another object of this invention is to provide means for producing a low birefringence, low stress, highly surface polished thermoplastic film or sheet on at least one surface thereof.

Still another object of this invention is provide a low birefringence transparent film or sheet suitable for optical media applications.

Yet, another object of the invention is to provide a one step continuous extrusion process for producing a low birefringence, low stress, highly surface polished transparent thermoplastic film or sheet.

These and other objects will become apparent from the following description of this invention.

SUMMARY OF THE INVENTION

The present invention is directed to products, apparatus and process for preparing thermoplastic film or sheet for optical media applications or non optical applications in the case of opaque film or sheet. The apparatus for producing a low birefringence, highly surface polished thermoplastic film or sheet comprises a calendering roll stack wherein at least one roll being of a particular novel construction in order to produce the product of this invention as well as a one step continuous extrusion process for producing the product of this invention which product is a low birefringence, low stress, highly polished transparent film or sheet or a low stress highly polished opaque film or sheet.

It has been surprisingly discovered that the novel structure of the calendering roll of this invention comprises at least a three component calendering roll structure comprised of an inner metal shell, an intermediate resilient elastomeric cover over the inner metal shell and a multi-layer metal sleeve outer covering. The multi-layer metal sleeve outer covering comprises at least two layers and preferably a three layer metal sleeve outer covering. The novel calendering roll of this invention and an opposing calendering roll form a calendering nip or gap through which thermoplastic film or sheet is continuously extruded. This process is also known as a continuous film or sheet extrusion process. As used herein, the terms "film" and "sheet" are used interchangeably and refer to thermoplastic material having a final thickness of about 0.001 to about 0.060 inches but may be thicker, if so desired, depending on the final application.

DETAILED DESCRIPTION OF THE INVENTION

Figure 1:
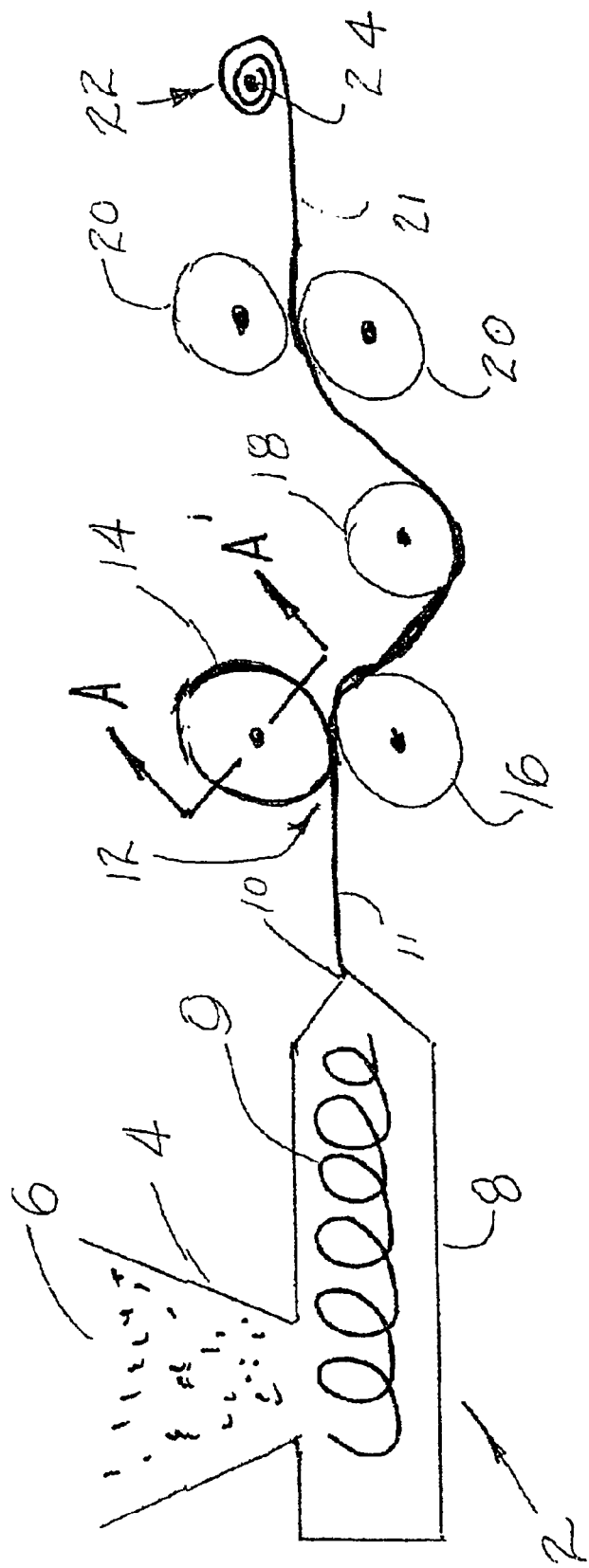
FIG. 1 is a schematic view of an extruder illustrating the extrusion of a thermoplastic melt through a calendering finishing roll stack for producing the thermoplastic film of this invention.

The present invention comprises products, and process apparatus for producing thermoplastic film particularly for transparent or translucent optical media applications wherein the product is a film of low birefringence, low stress and a highly polished surface on at least one surface thereof having a low roughness of less than about 4 microinches. The process comprises the steps of extruding a thermoplastic melt, passing the hot thermoplastic melt through the nip or gap of calendering rolls wherein at least one calendering roll is preferably the finishing roll of this invention, and the opposing calendering roll maybe a standard chrome plated steel roll, cooling the thermoplastic film to below its glass transition temperature and forwarding the cooled thermoplastic film, preferably, to a winder for winding the film in a roll. The process and apparatus are also suitable for producing low stress non optical opaque film for other applications wherein such film is used in vehicles, computer housings, telecommunications, etc.

While the invention is described as at least one finishing roll of a calendering roll stack, the calendering roll stack may be comprised of at least two of the novel finishing calendering rolls of this invention. The finishing roll of this invention is a multi component structure comprised of an inner steel shell, an intermediate resilient elastomeric covering over the inner steel shell and a multi layer metal sleeve outer covering. The resilient covering may be any type of resilient covering but is typically a silicone based rubber of about ⅛ inch to about 1 inch in thickness nay have a hardness of about 50 to about 150 durometer (Shore A), or the resilient covering may be an EPDM (ethylene propylene diamine monomer) based rubber. The resilient intermediate layer should be resilient to the extent that the resilient cover allows deformation of the outer multi-layer metal sleeve covering in order to greatly reduce the flow-induced stress which would lead to high birefringence and high stress thermoplastic film. The resilient covering should preferably have a maximum temperature rating for continuous use of about 600° F.

The outer multi-layer metal sleeve is typically about 0.005 inches to about 0.020 inches in total thickness which permits flexing to match the resilient intermediate cover underneath. The outer multi-layer metal sleeve may be a two or more layer sleeve but is preferably at least a three layer sleeve. The outer layer of the preferably three-layer outer covering preferably comprises a high density chrome outer layer of about 0.0002 to about 0.002 inches thick that can be polished to a smooth finish preferably a roughness of less than 4 microinches and more particularly less than 2 microinches and even more particularly less than 1 mircro-inch roughness. Chrome plating and chromium plating are used interchangeably to describe a thin layer of chromium which may be deposited by electrolysis on an oxidizable metal. The chrome layer thickness of less than 0.002 inch reduces the strain during flexing so the chrome will not crack and fail. The inner layer of the metal multi-layer outer metal sleeve is typically nickel or nickel based alloy such as Monel 400, which is 67 weight % nickel and 30 weight % copper, of about 0.002 to about 0.010 inches thick for mechanical integrity of the sleeve during it's manufacturing, handling and installation on the roller and preferably has a hardness rating of about 220 Vickers. Nickel is preferred for the inner layer of the multi-layer outer sleeve because of its low porosity and smooth surface. The middle layer or intermediate layer between the outer and inner layer thereof is typically copper of about 0.005 to about 0.020 inches thick and preferably about 0.001 to about 0.005 inches thick, which is relatively soft, ductile and flexible which also greatly reduces the strain on the chrome layer during flexing and prevents failure. It also exhibits good adhesion to both chrome and nickel. Nickel or nickel based alloys are employed as they are less brittle than chrome at room temperature. The novel roller of this invention provides both resiliency and surface polish at the same time and thus is able to produce low birefringence, low stress, highly polished film suitable for optical media applications.

A two layer outer metal sleeve may also be employed wherein the inner layer is preferably a nickel based alloy and the outer layer is preferably chrome. The inner layer would have thickness of about 0.014 inches and the outer layer of about 0.0015 inches thick.

The thermoplastic material that may be employed in producing the product of this invention, includes without limitation, aromatic polycarbonate, copolymers of an aromatic polycarbonate such as polyester carbonate copolymer, blends thereof, and blends thereof with other polymers depending on the end use application. Preferably the thermoplastic material is an aromatic polycarbonate resin and examples of polycarbonate resins are described in U.S. Pat. No. 4,351,920 which is incorporated herein by reference. They are obtained by the reaction of an aromatic dihydroxy compound with a carbonyl chloride. Other polycarbonate resins may be obtained by the reaction of an aromatic dihydroxy compound with a carbonate precursor such as a diaryl carbonate. A preferred aromatic dihydroxy compound is 2,2-bis(4-hydroxy phenyl) propane (i.e. Bisphenol-A). The polyester carbonate is obtained by the reaction of a dihydroxy phenol, a carbonate precursor and dicarboxylic acid such as terephthalic acid or isophthalic acid or a mixture of terephthalic and isophthalic acid. Optionally, an amount of a glycol may also be used as a reactant.

The transparent or translucent film produced by the practice of the invention has a low birefringence, a low stress and is highly polished on at least one surface thereof. The retardation value of the film i.e. birefringence times thickness is 100 nm or less and is preferably less than about 20 nm and more particularly less than about 15 nm. If the retardation value is over 100 nm the film has a high birefringence and a high stress value both of which are not wanted in the final film product of this invention since it would not be suitable for transparent or translucent optical applications and for opaque films where high stress is unacceptable. The surface of the highly polished thermoplastic film is less than about 4 microinches in roughness and preferably about 0.5 to about 2.0 microinchs in roughness. The transparent film also has less than 1% haze.

Opaque films produced in the practice of this invention are low stress films having a polished surface on at least one surface thereof. Since the films are opaque, birefringence is not measurable. However, low stress film is greatly desired for such applications as recited above, namely, on road and off road vehicles, computer housings, telecommunication equipment and such other application requiring low stress opaque film for graphics registration.

The process of producing the film of this invention comprises feeding a thermoplastic resin to a screw extruder, heating the resin to above its glass transition temperature (Tg) producing a viscous melt of thermoplastic resin, passing the viscous thermoplastic melt under pressure through the die orifice of the extruder which die orifice is generally a slot forming a continuous film of molten thermoplastic resin (extrudate), passing the extrudate through the nip or gap of a pair of a calendering roll system to form the finished film.

Preferably one roll of the calendering rolls is the multi component roll of this invention and is comprised of an inner steel shell, a resilient covering thereover and a multi-layer metal sleeve outer covering over the resilient covering.

While the calendering rolls are shown in a vertical stacking configuration, the calendering rolls may lie in a horizontal plane or in a plane at any angle of from 90° vertical to 0° horizontal. The angle of the plane at which the calendering rolls lie is not critical to the invention. The criticality of this invention lies in the structure of the finishing roll of this invention.

FIG. 1 is a schematic drawing of the continuous process of this invention and the apparatus employed herein illustrating extruder 2 with feed hopper 4 and through which thermoplastic resin 6 is fed to barrel 8 of extruder 2. The extruder is heated to a temperature sufficient to melt thermoplastic resin 6 which temperature is above the glass transition temperature (Tg) of the thermoplastic resin. The melted thermoplastic resin is advanced through extruder 2 by screw 9 to film die orifice 10. The extruded thermoplastic melt 11 is passed through nip or gap 12 formed by rolls 14 and 16, around roll 18 through pull rolls 20. Finished film 21, having a low birefringence, low stress and a highly polished surface, is wound on to roll core 24, by winder 22.

Figure 2:
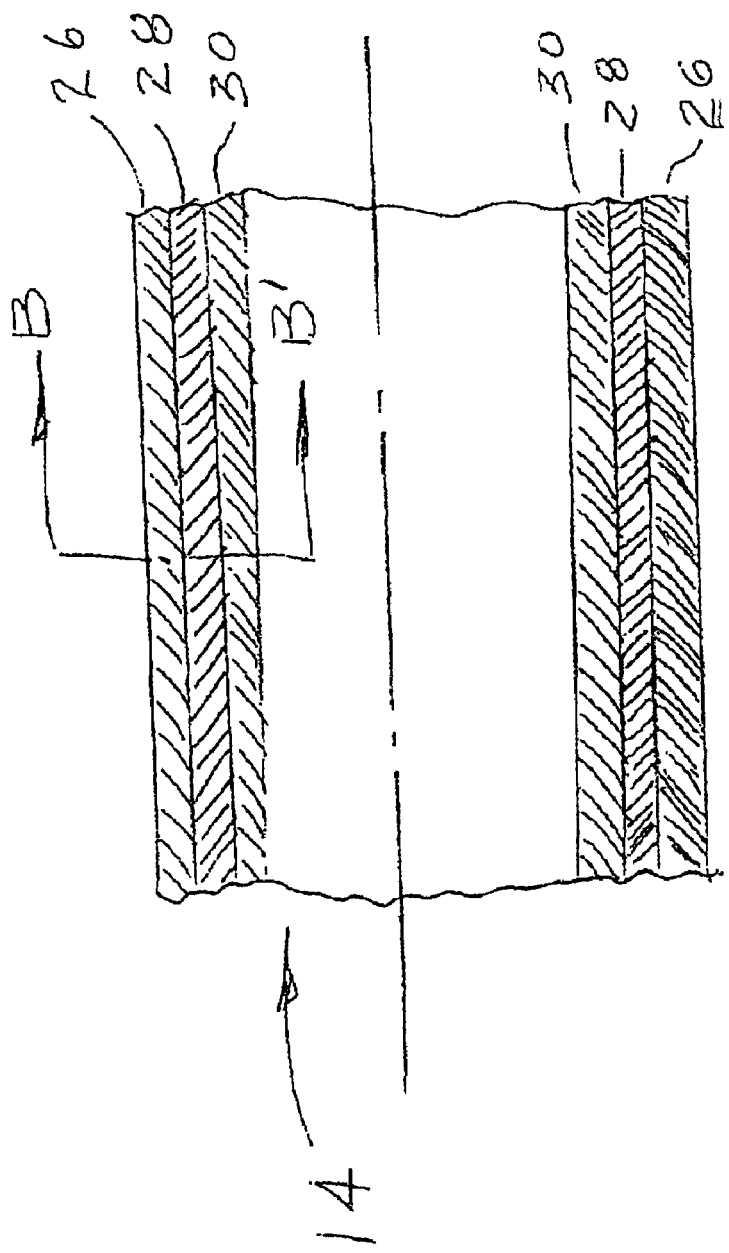
FIG. 2 is an enlarged sectional schematic section A–A' of the novel calendering roll of this invention.

FIG. 2 is an enlarged cross sectional view A–A' of roll 14 which is the novel finishing roll of this invention. Finishing roll 14 comprises inner steel shell 30, intermediate resilient cover 28 and outer multi-layer sleeve 26.

Figure 3:
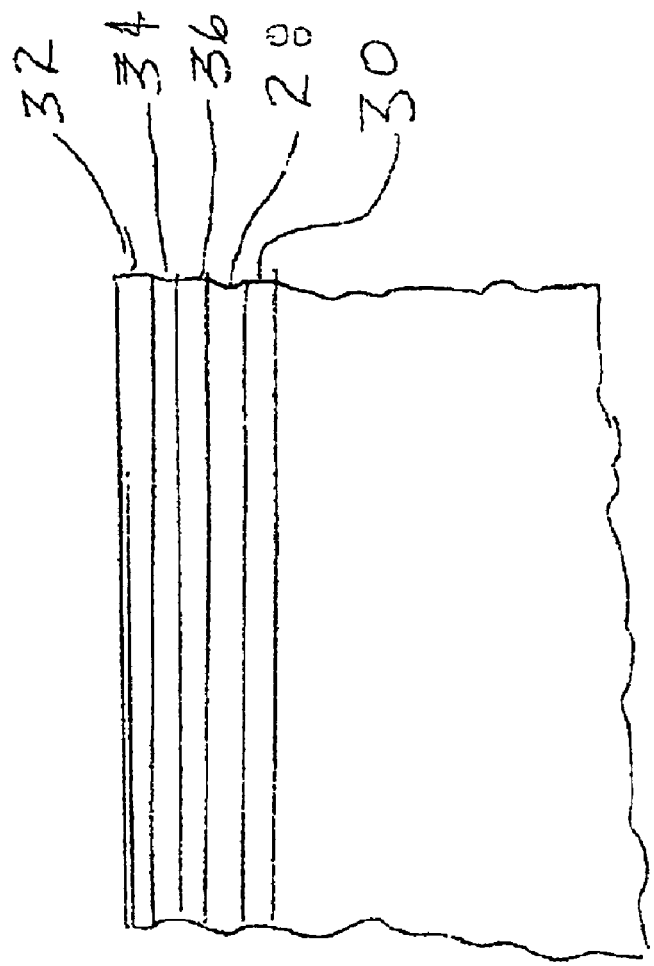
FIG. 3 is an enlarged sectional schematic section B–B' of the component parts of the novel calendering roll of the invention.

FIG. 3 is cross section of B–B' illustrating the three component structure of finishing roll 14 and in particular the multi-layer outer metal sleeve. While the multi-layer outer metal sleeve is illustrated and described as a three layer outer sleeve, it may consist of less than three or more than three layers. Inner steel shell 30 is covered by intermediate resilient cover 28, which is covered by outer multi-layer sleeve 26. Outer multi-layer sleeve 26 is illustrated as consisting of three layers, inner layer 36, which may be nickel, intermediate layer 34, which may be copper, and outer layer 32, which may be chrome.

The following example is provided merely to show one skilled in the art how to apply the principals of this invention as discussed herein. This example is not intended to limit the scope of the claims appended to this invention.

EXAMPLE I

A 55-inch long by 12-inch diameter calendering roll was constructed according to the present invention. The resilient cover was silicone rubber, ⅜-inch thick and 70 durometer hardness. The intermediate outer multi-layer sleeve was 0.005 inches of nickel, 0.009 inches of copper, and 0.0015 inches of chrome. The chrome was polished to approximately 2–4 microinch surface roughness. The inner shell of the roll was steel. The plastic extruded was polycarbonate of a melt flow index of approximately 6, extruded by a conventional single-screw extruder through a conventional film die. Line speed was 19 fpm, nip load was 100 pli, roll temperature 245° f. and pull roll amps 1.6 (proportional to web tension). Approximately 25,000 feet of 4-ft wide 0.010 inch thick film was produced having an average retardation value of 14 nm and a standard deviation of 1.8 nm. For comparison, typical samples of commercial "high quality" polish, such as polished polycarbonate 0.010 inches thick, produced by the conventional calendering process have retardations of 325–500 nm.

Although the present invention has been described and illustrated in detail, it is clearly understood that the same is by way of illustration and example only and is not to be taken by way of limitation; the spirit an scope of the present invention being limited only in terms of the appended claims.

What is claimed:

1. A continuous film extrusion process for producing a transparent or translucent thermoplastic film for optical media applications having a low birefringence, low stress and wherein at least one surface of the film has a roughness of less than about 4 microinches and a retardation value of less than about 100 nanometers, which process comprises:

extruding a molten thermoplastic film, and passing the molten thermoplastic film through an opening between two opposing calendaring rolls wherein at least one calendaring roll is a finishing roll and subsequently cooling the hot thermoplastic film to a temperature below its solidification temperature of the thermoplastic film, said finishing roll is a multi component structure comprised of an inner steel shell, an intermediate resilient covering over the inner steel and a multi-layer metal sleeve outer covering comprised of at least two layers.

2. The process of claim 1, wherein the cooled thermoplastic film has a thickness of about 0.001 to about 0.060 inches.

3. The process of claim 1 wherein at least one surface of the thermoplastic film has a roughness of about 0.5 to about 2.0 microinches.

4. The process of claim 1 wherein the 2 opposing calendaring rolls are finishing rolls used to produce a thermoplastic film of low birefringence, low stress and wherein bath surfaces of the thermoplastic film have a roughness of less than about 4 microinches.

5. The process of claim 4 wherein both surfaces of the thermoplastic film have a roughness of about 0.5 to about 2.0 microinches.

6. The process of claim 1 wherein the multi-layer metal sleeve outer covering has a total thickness of about 0.005 inches to about 0.020 inches.

7. The process of claim 1 wherein the multi-layer metal sleeve outer covering further comprises three-layers with a chrome outer layer having a thickness of about 0.0002 inches to about 0.002 inches.

8. The process of claim 7 wherein the multi-layer metal sleeve outer covering further comprises an inner layer having a thickness of about 0.002 inches to about 0.010 inches and comprising a material selected from the group of nickel and a nickel based alloy.

9. The process or claim 8 wherein the multi-layer metal sleeve outer covering further comprises a middle layer disposed between the outer layer and the inner layer, and wherein the middle layer comprises copper and has a thickness of about 0.005 inches to about 0.020 inches.

10. A continuous film extrusion process for producing a thermoplastic film having low stress and wherein at least one surface or the film has a roughness of less than about 4 microinches and a retardation value of less than about 100 nanometers, which process comprises:

extruding a molten thermoplastic him, and passing the molten thermoplastic film through an opening between two opposing calendaring rolls wherein at least one calendaring roll is a finishing roll and subsequently cooling the hot thermoplastic film to a temperature below its solidification temperature of the thermoplastic film, said finishing roll is a multi component structure comprised of an inner steel shall, arm intermediate resilient coveting over the inner steel and a multi-layer metal sleeve outer covering comprised of at least two layers.

11. The process of claim 10, wherein the cooled thermoplastic flint has a thickness of about 0.001 to about 0.060 inches.

12. The process of claim 10, wherein at least one surface of the thermoplastic film has a roughness of about 0.5 to about 2.0 microinches.

* * * * *